(12) United States Patent
Meta et al.

(10) Patent No.: US 9,309,348 B2
(45) Date of Patent: Apr. 12, 2016

(54) ADHESIVE COMPOSITION

(75) Inventors: Yosuke Meta, Tochigi (JP); Shinya Hattori, Tochigi (JP); Hiroto Nakano, Tochigi (JP); Akira Kamoi, Tochigi (JP); Naomi Furue, Tochigi (JP)

(73) Assignee: Nippon Carbide Industries Co., Inc., Tokyo (JP)

( * ) Notice: Subject to any disclaimer, the term of this patent is extended or adjusted under 35 U.S.C. 154(b) by 323 days.

(21) Appl. No.: 13/258,010

(22) PCT Filed: Mar. 23, 2010

(86) PCT No.: PCT/JP2010/054957
§ 371 (c)(1),
(2), (4) Date: Oct. 4, 2011

(87) PCT Pub. No.: WO2010/110254
PCT Pub. Date: Sep. 30, 2010

(65) Prior Publication Data
US 2012/0010341 A1    Jan. 12, 2012

(30) Foreign Application Priority Data
Mar. 24, 2009 (JP) ................... 2009-071597

(51) Int. Cl.
| | | |
|---|---|---|
| *C09J 7/02* | (2006.01) | |
| *C09D 11/10* | (2014.01) | |
| *C08G 18/62* | (2006.01) | |
| *C08G 18/64* | (2006.01) | |
| *C08G 18/76* | (2006.01) | |
| *C09J 175/04* | (2006.01) | |
| *C08F 220/18* | (2006.01) | |
| *C08G 18/40* | (2006.01) | |
| *C09J 133/08* | (2006.01) | |
| *C08L 33/06* | (2006.01) | |
| *G02B 5/30* | (2006.01) | |
| *G02F 1/1335* | (2006.01) | |

(52) U.S. Cl.
CPC .......... *C08G 18/6229* (2013.01); *C08F 220/18* (2013.01); *C08G 18/4081* (2013.01); *C08G 18/6254* (2013.01); *C08G 18/6492* (2013.01); *C08G 18/7621* (2013.01); *C09J 133/08* (2013.01); *C09J 175/04* (2013.01); *C08F 2220/1825* (2013.01); *C08L 33/062* (2013.01);

*G02B 5/3083* (2013.01); *G02F 1/1335* (2013.01); *G02F 2202/28* (2013.01)

(58) Field of Classification Search
USPC ................... 524/271, 272; 528/905
See application file for complete search history.

(56) References Cited

U.S. PATENT DOCUMENTS 8,329,847 B2 * 12/2012 Kim et al. ................. 526/326

FOREIGN PATENT DOCUMENTS

| | | | |
|---|---|---|---|
| EP | 0338724 | A2 | 10/1989 |
| JP | 7-228852 | A | 8/1995 |
| JP | 08-239639 | * | 9/1996 |
| JP | 09-26372 | * | 10/1997 |
| JP | 9-263742 | A | 10/1997 |
| JP | 10-204399 | | 4/1998 |
| JP | 10-204399 | A | 8/1998 |
| JP | 10-279907 | | 10/1998 |
| JP | 10-298528 | A | 11/1998 |
| JP | 2001181588 | * | 7/2001 |
| JP | 2004-307658 | * | 11/2004 |
| JP | 2005-146231 | | 6/2005 |
| JP | 2006-096956 | A | 4/2006 |
| JP | 2007-112839 | | 5/2007 |
| WO | 0181495 | A2 | 11/2001 |
| WO | 2008111412 | A1 | 9/2008 |

OTHER PUBLICATIONS

International Search Report PCT/JP2010/054957 mailed Jun. 7, 2010.
Extended European Search Report issued in EP counterpart application/ patent No. 10756050.0-1301/2412776 mailed Feb. 8, 2013.
Notification of Transmittal of Copies of Translation of the International Preliminary Report on Patentability issued in corresponding application PCT/JP2010/054957, mailed Oct. 27, 2011.
JP application No. 2011-506055 office action dated Mar. 17, 2014 and partial English translation.
JP application No. 2011-506055 office action dated Jul. 22, 2014 and partial English translation.

* cited by examiner

*Primary Examiner* — Monique Peets
(74) *Attorney, Agent, or Firm* — Roberts Mlotkowski Safran & Cole, PC

(57) ABSTRACT

Provided is an adhesive composition for use in an optical film, which is used for adhering an optical film, shows excellent durability even in a high temperature and high humidity environment, and prevents the occurrence of white spots, and also provided is an optical film with an adhesive. The adhesive composition contains (A) an acrylic copolymer containing a reactive functional group, (B) an isocyanate compound, and (C) a compound having a hydroxy group and a rosin skeleton.

7 Claims, No Drawings

ADHESIVE COMPOSITION

TECHNICAL FIELD

This invention relates to an adhesive composition used at the time of adhesion of an optical film such as a polarizing film or a phase difference film to an adherend such as a liquid crystal cell, and an optical film with an adhesive layer using the adhesive composition. In particular, this invention relates to an adhesive composition that shows excellent durability even in a high temperature and high humidity environment, and is excellent in an ability to prevent the occurrence of white spots, and an optical film with an adhesive layer using the adhesive composition.

BACKGROUND ART

Usually, a liquid crystal display device includes a liquid crystal cell that a liquid crystal component oriented in a predetermined direction is sandwiched between two supporting substrates such as glass, and an optical film such as a polarizing film, a phase difference film or a brightness improving film. An adhesive composition is frequently used at the time of lamination of the optical films and adhesion of the optical film to the liquid crystal cell.

The liquid crystal display device is used as a display device of a personal computer, a television set, a car navigation system and the like in a wide range. It sometimes happens that these devices are used in such a severe environment as a high temperature and high humidity. Consequently, it is required for an adhesive composition to have such excellent durability that separation and air bubbles do not occur even in a long-term use. In addition, in such a severe environment as a high temperature and high humidity, the optical film is subjected to increase in change of dimension such as shrinkage or expansion. The conventional adhesive composition layer cannot relax stress generated due to the change of dimension so that residual stress of the optical film becomes inhomogeneous. As a result, so-called "white spots" meaning a phenomenon that the peripheral part of liquid crystal display device is whitened due to the fact that a light is leaked from the part, have been problematic.

For improving the above-mentioned problem, an adhesive composition has been proposed, that has a stress relaxation property by that a low molecular weight polymer is added to the adhesive composition. For example, in Patent Literature 1 (JP-A-1998(Heisei-10)-279907), an adhesive composition for a polarizing plate that includes a high molecular weight acrylic copolymer, a low molecular weight acrylic copolymer having weight-average molecular weight of not more than 30,000 and a polyfunctional compound has been disclosed. However, the adhesive composition described in Patent Literature 1 contains a large amount of the low molecular weight acrylic copolymer having weight-average molecular weight of not more than 30,000 so that it is difficult to prevent the occurrence of bubbles and the separation.

As methods for inhibiting the white spots, there are a method of preventing the occurrence of the white spots by following the change of dimension of the polarizing film so as to relax concentration of stress as the adhesive composition described in Patent Literature 1, and to the contrary, a method of preventing the occurrence of the white spots by using an adhesive composition having high cohesion force so as to keep a region in which stress occurs at a minimum.

In Patent Literature 2 (JP-A-2007-112839), for improving adhesion properties of an adhesive layer, an adhesive composition has been disclosed, that includes 0.02 to 2 parts by weight of a peroxide, 0.02 to 2 parts by weight of an isocyanate cross-linking agent, and 1 to 40 parts by weight of a tackifier resin having a softening point of not less than 80 degrees C. relative to 100 parts by weight of an acrylic copolymer. However, the Patent Literature 2 fails to describe about the white spots, so that the ability to prevent the occurrence of the white spots is not satisfied only by having the above-mentioned configuration.

PRIOR ART DOCUMENTS

Patent Literature

Patent Literature 1: JP-A-1998(Heisei-10)-279907
Patent Literature 2: JP-A-2007-112839

SUMMARY OF THE INVENTION

Problems to be Solved by the Invention

Therefore, it is an object of the invention to provide an adhesive composition excellent in an ability to prevent the occurrence of white spots and durability, and an optical film with an adhesive layer using the adhesive composition.

Means for Solving the Problems

In order to achieve the above-mentioned object, the invention provides an adhesive composition having the configuration described below and an optical film with an adhesive layer using the adhesive composition.
(1) An adhesive composition comprising an acrylic copolymer (A) containing a carboxyl group, an isocyanate compound (B), and a compound (C) having a hydroxyl group and a rosin skeleton.
(2) The adhesive composition according to the above-mentioned (1), wherein the adhesive composition further comprises an acrylic copolymer (D) containing a carboxyl group and a hydroxyl group.
(3) The adhesive composition according to the above-mentioned (1) or (2), wherein the compound (C) having a hydroxyl group and a rosin skeleton is a compound having a skeleton represented by the formula (1) described below in the molecule.

[Chem.1]

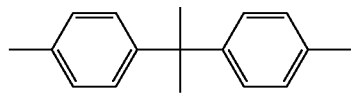

(1)

(4) The adhesive composition according to any one of the above-mentioned (1) to (3), wherein not less than 5 parts by weight and not more than 20 parts by weight of the isocyanate compound (B) are contained relative to 100 parts by weight of the total amount of the acrylic copolymer.
(5) The adhesive composition according to any one of the above-mentioned (1) to (4), wherein not less than 1 parts by weight and not more than 20 parts by weight of the compound (C) having a hydroxyl group and a rosin skeleton are contained relative to 100 parts by weight of the total amount of the acrylic copolymer.
(6) The adhesive composition according to any one of the above-mentioned (1) to (5), wherein a ratio of an equivalent of the isocyanate group relative to 1 equivalent of the total of the reactive functional groups of the acrylic copolymer is more than 1 and not more than 5.

(7) The adhesive composition according to any one of the above-mentioned (1) to (6), wherein a blending quantity ratio of the compound (C) having a hydroxyl group and a rosin skeleton relative to the isocyanate compound (B) is not less than 0.3 and not more than 4.

(8) The adhesive composition according to any one of the above-mentioned (2) to (7), wherein the acrylic copolymer (D) contains t-butyl acrylate as a copolymer component.

Advantages of the Invention

An adhesive composition and an optical film with an adhesive layer using the adhesive composition according to the present invention have a good balance between cohesion force and stress relaxation properties, thus they are excellent in durability even in a high temperature and high humidity environment, thereby they can prevent the occurrence of white spots.

EMBODIMENT FOR CARRYING OUT THE INVENTION

The inventors et al. have been earnestly investigated, as a result, they have found that an adhesive composition (hereinafter, may be referred to as "single-type adhesive composition") excellent in durability and an ability to prevent the occurrence of white spots can be provided by using an adhesive composition including an acrylic copolymer (A) containing a reactive functional group, an isocyanate compound (B), and a compound (C) having a hydroxyl group and a rosin skeleton. In addition, the inventors et al. have been earnestly investigated to solve the above-mentioned problem, as a result, they have found that an adhesive composition (hereinafter, may be referred to as "mixture-type adhesive composition") excellent in durability and an ability to prevent the occurrence of white spots can be provided by using an adhesive composition including an acrylic copolymer (A) containing a reactive functional group, an acrylic copolymer (D) containing a reactive functional group different from the acrylic copolymer (A), an isocyanate compound (B), and a compound (C) having a hydroxyl group and a rosin skeleton.

[First embodiment]
(Single-type Adhesive Composition)

The adhesive composition according to the first embodiment includes an acrylic copolymer (A) containing a reactive functional group, an isocyanate compound (B), and a compound (C) having a hydroxyl group and a rosin skeleton. In the adhesive composition according to the first embodiment, it is considered that the reactive functional group of the acrylic copolymer (A) and the isocyanate compound (B) carry out a cross-linking reaction with each other and simultaneously an isocyanate group that does not contribute to the cross-linking reaction of the isocyanate compound (B) reacts with water in a curing environment and the compound (C) having a hydroxyl group and a rosin skeleton so as to form a multimeric complex, thereby the adhesive composition according to the first embodiment has a good adhesive property.

In the first embodiment, the acrylic copolymer (A) means a copolymer that includes an acrylate monomer or methacrylate monomer as the main component, and is obtained by copolymerizing the acrylate monomer or methacrylate monomer and a monomer having a reactive functional group. Further, in the present application, the term "(meth)acrylic" is used in referring to both of "acrylic" and "methacrylic".

The acrylic copolymer (A) according to the first embodiment is a copolymer in which preferably not less than 80% by weight and more preferably not less than 90% by weight of a (meth)acrylate is contained.

The (meth)acrylate monomer is not particularly limited if it has a (meth)acrylate structure, for example, it is possible to use one or not less than two of an alkyl (meth)acrylate having a straight-chain or a branched chain alkyl group with 1-18 carbon atoms, such as methyl (meth)acrylate, ethyl (meth)acrylate, n-butyl (meth)acrylate, i-butyl (meth)acrylate, t-butyl (meth)acrylate, n-octyl (meth)acrylate, i-octyl (meth)acrylate, 2-ethylhexyl (meth)acrylate, n-nonyl (meth)acrylate, i-nonyl (meth)acrylate, n-decyl (meth)acrylate, n-dodecyl (meth)acrylate, stearyl (meth)acrylate, and various derivatives thereof. Of these, n-butyl (meth)acrylate is preferably used.

A polymerization component of the acrylic copolymer (A) according to the first embodiment includes a monomer having a reactive functional group for the purpose of reacting the acrylic copolymer (A) and the isocyanate compound (B). Further, a (meth)acrylate monomer having a reactive functional group is also counted as an amount of the (meth)acrylate monomer contained as the copolymer component in the acrylic copolymer (A) when the acrylic copolymer (A) is defined.

As the monomer having a reactive functional group, for example, it is possible to use one or not less than two of a carboxyl group-containing monomer, a hydroxyl group-containing monomer, a glycidyl group-containing monomer, an amide group or a N-substituted amide group-containing monomer, a tertiary amino group-containing monomer and the like.

As the carboxyl group-containing monomer, for example, it is possible to use acrylic acid, methacrylic acid, maleic acid, maleic acid anhydride, fumaric acid, crotonic acid, itaconic acid, citraconic acid, cinnamic acid, succinic acid monohydroxyethyl (meth)acrylate, maleic acid monohydroxyethyl (meth)acrylate, fumaric acid monohydroxyethyl (meth)acrylate, phthalic acid monohydroxyethyl (meth)acrylate, 1,2-dicarboxycyclohexane monohydroxyethyl (meth)acrylate, (meth)acrylic acid dimer, ω-carboxy-polycaprolactonemono (meth)acrylate and the like.

As the hydroxyl group-containing monomer, for example, it is possible to use 2-hydroxyethyl (meth)acrylate, 2-hydroxypropyl (meth)acrylate, 3-hydroxypropyl (meth)acrylate, 4-hydroxybutyl (meth)acrylate, 3-methyl-3-hydroxybutyl (meth)acrylate, 1,1-dimethyl-3-butyl (meth)acrylate, 1,3-dimethyl-3-hydroxybutyl (meth)acrylate, 2,2,4-trimethyl-3-hydroxypentyl (meth)acrylate, 2-ethyl-3-hydroxyhexyl (meth)acrylate, glycerinmono (meth)acrylate, polypropyleneglycolmono (meth)acrylate, polyethyleneglycolmono (meth)acrylate, poly(ethyleneglycol-propyleneglycol)mono (meth)acrylate, N-methylolacrylamide, allyl alcohol and methallyl alcohol and the like.

As the glycidyl group-containing monomer, for example, it is possible to use glycidyl (meth)acrylate, 3,4-epoxycyclohexylmethyl (meth)acrylate, glycidyl vinyl ether, 3,4-epoxycyclohexyl vinyl ether, glycidyl (meth)allyl ether, 3,4-epoxycyclohexyl (meth)allyl ether and the like.

As the amide group or N-substituted amide group-containing monomer, for example, it is possible to use acrylamide, methacrylamide, N-methyl (meth)acrylamide, N-ethyl (meth)acrylamide, N-methoxymethyl (meth)acrylamide, N-ethoxymethyl (meth)acrylamide, N-propoxymethyl (meth)acrylamide, N-butoxymethyl (meth)acrylamide, N-tert-butyl acrylamide, N-octyl acrylamide, diacetone acrylamide and the like.

As the tertiary amide group-containing monomer, it is possible to use dimethylaminoethyl (meth)acrylate, diethylaminoethyl (meth)acrylate, dimethylaminopropyl (meth)acrylamide and the like.

It is preferable that the acrylic copolymer (A) contains the carboxyl group-containing monomer, or the carboxyl group-containing monomer and the hydroxyl group-containing monomer as the component of the copolymer.

The content ratio of the carboxyl group-containing monomer as the copolymer component is controlled to not less than 0.5% by weight, and preferably not less than 1% by weight in the acrylic copolymer (A), for the purpose of increasing cohesion force of the adhesive composition so as to enhance durability of the adhesive composition. In addition, the content ratio of the carboxyl group-containing monomer as the copolymer component is controlled to not more than 5% by weight, preferably not more than 3% by weight in the acrylic copolymer (A), for the purpose of preventing adhesion force of the adhesive composition from becoming too high.

The content ratio of the hydroxyl group containing monomer as the copolymer component is controlled to not less than 0.001% by weight, and preferably not less than 0.01% by weight in the acrylic copolymer (A), for the purpose of preventing the white spots. In addition, the content ratio of the hydroxyl group containing monomer as the copolymer component is controlled to not more than 1% by weight, and preferably not more than 0.5% by weight in the acrylic copolymer (A), for the purpose of preventing the occurrence of separation at durability test.

It is possible for the acrylic copolymer (A) according to the first embodiment to contain monomers other than the (meth)acrylate monomer of the acrylic copolymer (A) as the copolymer component. As the monomer other than the (meth)acrylate monomer, as an example, it is possible to use saturated fatty acid vinyl ester, aromatic vinyl ester, vinyl cyanide, diester of maleic acid or fumaric acid. As the saturated fatty acid vinyl ester, for example, it is possible to use vinyl formate, vinyl acetate, vinyl propionate, "vinyl versatate" (trade name), preferably vinyl acetate; as aromatic vinyl ester, for example, it is possible to use styrene, α-methylstyrene, vinyl toluene and the like; as the vinyl cyanide, for example, it is possible to use acrylonitrile, methacrylonitrile; and as diester of maleic acid or fumaric acid, for example, it is possible to use dimethyl malate, di-N-butyl malate, di-2-ethylhexyl malate, di-N-octyl malate, dimethyl fumarate, di-N-butyl fumarate, di-2-ethylhexyl fumarate, di-N-octyl fumarate.

The weight-average molecular weight (Mw) of the acrylic copolymer (A) according to the first embodiment is controlled to not less than 700,000, preferably not less than 1,000,000, more preferably not less than 1,200,000, and most preferably not less than 1,400,000, for the purpose of providing sufficient cohesion force for the adhesive composition and preventing the occurrence of air bubbles. In addition, the weight-average molecular weight (Mw) of the acrylic copolymer (A) is controlled to not more than 2,500,000, for the purpose of ensuring coating workability of the adhesive composition.

The weight-average molecular weight (Mw) of the acrylic copolymer is a value measured by the method described below.
(Measuring Method of Weight-average Molecular Weight (Mw))

The weight-average molecular weight (Mw) is measured in accordance with the following steps (1) to (3).
(1) Coating a paper liner with an acrylic copolymer solution, and drying at 100 degrees C. for 2 minutes so as to obtain an acrylic copolymer having a film-like shape.
(2) Dissolving the acrylic copolymer having a film-like shape with tetrahydrofuran so as to obtain solid content of 0.2%.
(3) Measuring the weight-average molecular weight (Mw) of the acrylic copolymer by using gel permeation chromatography (GPC) under the conditions described below.
(Conditions)
GPC: HLC-8220 GPC (manufactured by Tosoh Corporation)
Column: TSK-GEL GMHXL Use of Four columns
Mobile phase solvent: tetrahydrofuran
Standard sample: standard polystyrene
Flow speed: 0.6 ml/min Column temperature: 40 degrees C.

The glass-transition temperature (Tg) of the acrylic copolymer (A) is controlled to not less than −80 degrees C., and preferably not less than −60 degrees C., for the purpose of providing sufficient cohesion force for the adhesive composition and allowing the composition to bring out sufficient durability. In addition, the glass-transition temperature (Tg) of the acrylic copolymer (A) is controlled to not more than −20 degrees C., and preferably not more than −40 degrees C., for the purpose of allowing the adhesive composition to bring out sufficient adhesion to the supporting substrate so as to allow the composition to bring out durability that the separation or the like does not occur.

The glass-transition temperature (Tg) of the acrylic copolymer is a value obtained by converting a temperature (K) calculated by the Formula 1 described below to a temperature (degrees C.).

$$1/Tg = M1/Tg1 + M2/Tg2 + M3/Tg3 + \ldots Mn/Tgn \qquad \text{[Formula 1]}$$

In the Formula 1, Tg1, Tg2, Tg3 . . . and Tgn represent the glass-transition temperature (K) of homopolymer of the component 1, component 2, component 3, . . . and component n respectively. Also, in the Formula 1, M1, M2, M3, . . . and Mn represent the molar fraction of the respective components.

The polymerization method of the acrylic copolymer used for the first embodiment is not particularly limited, but it is possible to use a method such as solution polymerization, emulsion polymerization, and suspension polymerization. Further, when the adhesive composition according to the first embodiment is manufactured by using a mixture of the copolymer obtained by polymerization, it is preferable that the polymerization is carried out by solution polymerization, since the processing steps are relatively easy and carried out in a short time.

Generally, as the solution polymerization, it is possible to use a method, for example, that includes storing predetermined organic solvents, monomers, polymerization initiators, and chain transfer agents used if necessary in a polymerization tank, and carrying out a heating reaction in a stream of nitrogen gas or under reflux of the organic solvent for several hours while stirring. Further, the weight-average molecular weight of the acrylic copolymer (A) according to the first embodiment can be controlled so as to have a desired molecular weight by adjusting the reaction temperature, the reaction time, the amount of solvent, and the sort and amount of catalyst.

The adhesive composition according to the first embodiment includes the isocyanate compound (B). As the isocyanate compound (B), for example, it is possible to use an aromatic isocyanate such as xylylene diisocyanate, diphenylmethane diisocyanate, triphenylmethane triisocyanate, tolylene diisocyanate; an aliphatic or alicyclic isocyanate such as hexamethylene diisocyanate, isophorone diisocyanate, a hydrogenation product of the above-mentioned aromatic isocyanate compound; and an isocyanate compound derived from various types of isocyanates such as a dimer or a trimer of the above-mentioned isocyanates, or an adduct of the above-mentioned isocyanates and polyol such as trimethylol propane. The above-mentioned isocyanate compound can be used individually or in combination with each other.

As the isocyanate compound (B), for example, it is possible to appropriately use commercially available products sold under the trade names such as "Coronate L", "Coronate HX", "Coronate HL-S", and "Coronate 2234" manufactured by Nippon Polyurethane Industry Co., Ltd.; "Desmodur N 3400" manufactured by Sumitomo Bayer Urethane Co., Ltd.; "Duranate E-405-80T" and "Duranate TSE-100" manufactured by Asahi Kasei Corporation; and "Takenate D-110N", "Takenate D-120N", and "Takenate M-631N" manufactured by Mitsui Takeda Chemicals Inc.

Above all, as the isocyanate compound (B), an isocyanate derived from an aromatic isocyanate is preferable in terms of durability and white spots, and an isocyanate derived from tolylene diisocyanate is more preferable.

A used amount of the isocyanate compound (B) is controlled to not less than 5 parts by weight, preferably not less than 7 parts by weight relative to 100 parts by weight of the acrylic copolymer (A), for the purpose of preventing the occurrence of white spots. In addition, a used amount of the isocyanate compound (B) is controlled to not more than 20 parts by weight, preferably not more than 15 parts by weight relative to 100 parts by weight of the acrylic copolymer (A), for the purpose of ensuring compatibility between the acrylic copolymer (A) and the isocyanate compound (B) and generating sufficient tacky feeling as an adhesive composition.

In addition, in the adhesive composition according to the first embodiment, it is considered that the isocyanate group of the isocyanate compound (B) not contributing to the crosslinking with the copolymer forms a multimeric complex by reacting with water in the curing environment and the compound (C) having a hydroxyl group and a rosin skeleton. The reactivity between the isocyanate group and water in the curing environment and the compound (C) having a hydroxyl group and a rosin skeleton is relatively high. Therefore, it is considered that even though the isocyanate group is not provided in an amount excessive to the reactive functional group of the acrylic copolymer (A), a part of the isocyanate group forms the multimeric complex by reacting with water in the curing environment and the compound (C) having a hydroxyl group and a rosin skeleton. In the adhesive composition according to the first embodiment, for the purpose of forming as much multimeric complex as possible in order to prevent the occurrence of white spots and enhance durability, the isocyanate group is used in an amount of more than 1 equivalent, preferably not less than 1.2 equivalent, more preferably not less than 1.5 equivalent, relative to 1 equivalent of the total reactive functional groups of the acrylic copolymer (A). In addition, in the adhesive composition according to the first embodiment, for the purpose of generating sufficient tackiness as an adhesive composition so as to allow the composition to develop durability that the separation does not occur, it is preferable that not more than 5 equivalent of the isocyanate group is used relative to 1 equivalent of the total reactive functional groups of the acrylic copolymer (A).

In the adhesive composition according to the first embodiment, a crosslinking agent other than the isocyanate compound (B) can be used concurrently. The crosslinking agent other than the isocyanate compound (B) is not particularly limited, if it reacts with the acrylic copolymer (A) so as to form a crosslinking structure, and includes an aziridine compound, an epoxy compound, a melamine-formaldehyde condensate, a metallic salt, and a metallic chelate compound. The crosslinking agent other than the isocyanate compound (B) can be used individually or in combination of at least two thereof. In the first embodiment, it is preferable that the aziridine compound and/or the epoxy compound are/is used as the crosslinking agent other than the isocyanate compound (B).

As the aziridine compound, it is possible to use a reaction product of the isocyanate compound and ethyleneimine, and as the isocyanate compound, it is possible to use the above-exemplified compounds. Also, a compound obtained by adding ethyleneimine to a polyvalent ester of polyol such as trimethylol propane or pentaerythritol and (meth)acrylic acid or the like is known and can be used.

The aziridine compound includes, for example, N,N'-hexamethylenebis (1-aziridine carboamide), methylenebis [N-(1-aziridinylcarbonyl))-4-aniline], tetramethylolmethane-tris (β-aziridinylpropionate), trimethylolpropane-tris (β-aziridinylpropionate), above all, it is possible to appropriately use commercially available products sold under the trade names such as "TAZO", and "TAZM" manufactured by Sogo Pharmaceutical Co., Ltd.; and "CHEMITITE PZ-33" manufactured by Nippon Shokubai Co., Ltd.

As the epoxy compound, for example, it is possible to use ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether, polyglycerol polyglycidyl ether, resorcin diglycidyl ether, 2,2-dibromoneopentyl glycol diglycidyl ether, trimethylolpropane triglycidyl ether, pentaerythritol polyglycidyl ether, sorbitol polyglycidyl ether, adipic acid diglycidyl ether, phthalic acid diglycidyl ether, tris (glycidyl)isocyanurate, tris (glycydoxyethyl)isocyanurate, 1,3-bis(N,N-glycidylaminomethyl)cyclohexane, N,N,N',N'-tetraglycidyl-m-xylylenediamine.

Of the epoxy compound, it is preferred to use an epoxy compound having at least three epoxy groups, above all, it is more preferred to use an epoxy compound such as tris (glycidyl)isocyanurate, tris (glycydoxyethyl)isocyanurate, 1,3-bis(N,N-glycidylaminomethyl)cyclohexane, N,N,N',N'-tetraglycidyl-m-xylylenediamine, and it is furthermore preferred to use 1,3-bis(N,N-glycidylaminomethyl)cyclohexane, N,N,N',N'-tetraglycidyl-m-xylylenediamine. As the epoxy compound like this, for example, it is possible to appropriately use commercially available products sold under the trade names such as "TETRAD-C", and "TETRAD-X" manufactured by Mitsubishi Gas Chemical Company Inc.

The adhesive composition according to the first embodiment includes the compound (C) having a hydroxyl group and a rosin skeleton.

As the compound (C) having a hydroxyl group and a rosin skeleton, it is possible to use, for example, a reactant of rosin and a polyhydric alcohol, a reactant of rosin and an epoxy compound, and a rosin phenol. As the above-mentioned rosin, it is possible to use a wood rosin, a gum rosin, a hydrogenated rosin, a disproportionated rosin, tall oil rosin, and a polymerized rosin such as a wood based polymerized rosin, a gum based polymerized rosin, a tall oil based polymerized rosin, and a mixture of the above-mentioned compounds or the like.

The polyhydric alcohol is not particularly limited, if it has not less than two hydroxy groups. For example, it is possible to particularly exemplify a dihydric alcohol such as ethylene glycol, diethylene glycol, 1,2-dihydroxypropane, 1,3-dihydroxypropane, 1,2-dihydroxybutane, 1,3-dihydroxybutane, 2,3-dihydroxybutane, neopentyl glycol, 1,4-bis-hydroxymethyl-cyclohexane, 1,6-hexanediol, octene glycol, polyethylene glycol; a trihydric alcohol such as glycerol, 1,2,4-butanetriol, triethylene glycol, tripropylene glycol, 3-methylpentane-1,3,5-triol, glycerin; a tetrahydric alcohol such as diglycerin, pentaerythritol; but a pentahydric alcohol can be also used.

The above-mentioned reaction of rosin and polyhydric alcohol is not particularly limited, it is possible to use various known ways and means. In particular, it is only necessary to feed rosin and a polyhydric alcohol into a reaction container (preferably in a stream of inert gas such as nitrogen gas or noble gas), normally heat the reaction system at approximately 150 to 300 degrees C. at atmospheric pressure, and react them with each other while water generated is eliminated to the outside of the reaction system. In addition, it is possible to use an esterification catalyst at the reaction. In particular, for example, it includes an acid catalyst such as acetic acid, para-toluenesulfonic acid; an alkali metal hydroxide such as lithium hydroxide; an alkali earth metal hydroxide such as calcium hydroxide; a metal oxide such as calcium oxide, magnesium oxide; and the like.

As the above-mentioned epoxy compound, for example, it is possible to use various known diepoxy compound. In particular, it includes an acyclic aliphatic diglycidyl ether group such as ethylene glycol diglycidyl ether, diethylene glycol diglycidyl ether, triethylene glycol diglycidyl ether, polyethylene glycol diglycidyl ether, propylene glycol diglycidyl ether, dipropylene glycol diglycidyl ether, tripropylene glycol diglycidyl ether, polypropylene glycol diglycidyl ether, neopentyl glycol diglycidyl ether, 1,6-hexanediol diglycidyl ether; an aromatic or a cyclic aliphatic diglycidyl ether group such as 2,2-bis(4-hydroxyphenyl)propane diglycidyl ether, bis(4-hydroxyphenyl)methane diglycidyl ether, 1,1-bis(4-hydroxyphenyl)ethane diglycidyl ether, 2,2-bis(4-hydroxycyclohexyl)propane diglycidyl ether, 3,3',5,5'-tetramethyl-4,4'-dihydroxybiphenyl diglycidyl ether, 2,2-bis(4-(β-hydroxypropoxy)phenyl)propane diglycidyl ether; and a cyclic aliphatic cyclic oxirane group such as 3,4-epoxycyclohexylmethyl, 3,4-epoxycyclohexanecarboxylate, and vinylcyclohexendioxide.

The above-mentioned reaction of rosin and epoxy compound is not particularly limited, it is possible to use various known ways and means. For example, it is only necessary to apply a ring-opening addition reaction to 1 mole of a diepoxy compound and 2 mole of rosin in the presence of a catalyst at 120 to 200 degrees C., and to continue the reaction until the acid number becomes not more than 5, preferably not more than 3. As the catalyst, it is possible to use, for example, an amine based catalyst such as trimethylamine, triethylamine, tributylamine, benzyldimethylamine, pyridine, 2-methylimidazole; a quaternary ammonium salt such as benzyltrimethylammonium chloride; a Lewis acid; a borate ester; an organic metal compound; an organic metal salt; and the like. The reactant obtained by the above-mentioned method is a diol compound that has two rosin skeletons and two hydroxyl groups in the molecule, and has narrow molecular weight distribution. In addition, it is also possible to use a polymer obtained by applying a ring-opening polymerization to ethyleneoxide, propyleneoxide or ε-caprolactone using the above-mentioned diol compound as an initiator.

As the rosin phenol, it is possible to use a reactant obtained by carrying out an addition reaction that phenol group is added to rosin; a so-called rosin modified phenolic resin that is obtained by reacting rosin with a resol type phenolic resin obtained by carrying out an addition reaction that phenol group and folmaldehyde are added to each other in the presence of a alkali catalyst; and the like. It is possible to use any phenol group, if it can add to rosin. In particular, it includes phenol, cresol, β-naphthol, para-t-butylphenol, para-octylphenol, and para-nonylphenol.

As the compound (C) having a hydroxyl group and a rosin skeleton, it is possible to approximately use, for example, commercially available products sold under the trade names such as "Pine Crystal D-6011", "Pine Crystal KE-615-3", "Pine Crystal D-6240", and "Pine Crystal KE-359" manufactured by Arakawa Chemical Industries, LTD., and "NEOTALL 125P" and "NEOTALL 150P" manufactured by Harima Chemicals, Inc.

As the compound (C) having a hydroxyl group and a rosin skeleton, it is preferred to use a compound that has a skeleton shown in the formula (1) described below in the molecule.

[Chem. 2]

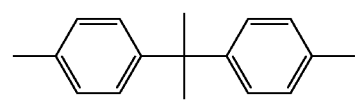

(1)

It is particularly preferable that the compound (C) having a hydroxyl group and a rosin skeleton is a compound shown in the formula (2) described below.

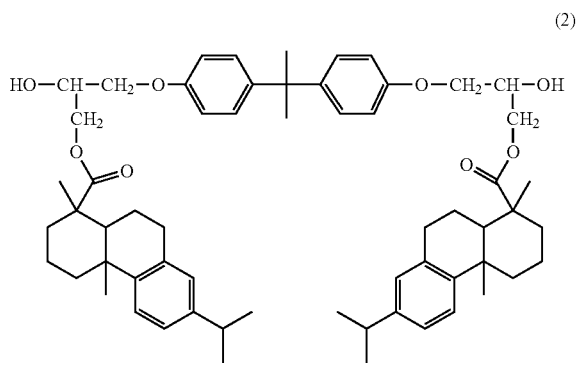 [SMILES: CC(C)c1ccc2c(c1)CCC1C(C)(C(=O)OCC(O)COc3ccc(C(C)(C)c4ccc(OCC(O)COC(=O)C5(C)CCCC6(C)c7ccc(C(C)C)cc7CCC56)cc4)cc3)CCCC21C]

(2)

A used amount of the compound (C) having a hydroxyl group and a rosin skeleton is controlled to not less than 1 parts by weight, preferably not less than 2.5 parts by weight, more preferably not less than 5 parts by weight, most preferably not less than 10 parts by weight relative to 100 parts by weight of the acrylic copolymer (A), for the purpose of preventing the occurrence of white spots. Also, the used amount of the compound (C) having a hydroxyl group and a rosin skeleton is controlled to preferably not more than 20 parts by weigh relative to 100 parts by weight of the acrylic copolymer (A), for the purpose of ensuring compatibility between the acrylic copolymer (A) and the compound (C) having a hydroxyl group and a rosin skeleton.

A blending quantity ratio of the compound (C) having a hydroxyl group and a rosin skeleton relative to the isocyanate compound (B) (namely, the additive amount (parts by weight) of the compound (C) having a hydroxyl group and a rosin skeleton/the additive amount (parts by weight) of the isocyanate compound (B)) is controlled to not less than 0.3, for the purpose of preventing the occurrence of white spots. Also, the blending quantity ratio of the compound (C) having a hydroxyl group and a rosin skeleton relative to the isocyanate compound (B) is controlled to not more than 4, preferably not more than 3, for the purpose of preventing the occurrence of air bubbles in the durability test.

The adhesive composition according to the first embodiment further can include a silane compound. As the silane compound, it is possible to use an organic substituent group containing silicone alkoxyoligomer such as a mercapto group containing silicone alkoxyoligomer, an epoxy group containing silicone alkoxyoligomer, an amino group containing silicone alkoxyoligomer, a phenyl group containing silicone alkoxyoligomer, and a methyl group containing silicone alkoxyoligomer; a mercapto group containing silane compound such as γ-mercaptopropyltrimethoxysilane, γ-mercaptopropyltriethoxysilane, and γ-mercaptopropyldimethoxymethylsilane; an alicyclic epoxy group containing silane compound such as β-(3,4-epoxycyclohexyl)ethyltrimethoxysilane, and β-(3,4-epoxycyclohexyl)ethyltriethoxysilane; an epoxy group containing silane compound such as methyltri (glycidyl) silane, γ-glycydoxypropylmethyldimethoxysilane, γ-glycydoxypropyltrimethoxysilane, and γ-glycydoxypropyltriethoxysilane; a carboxyl group containing silane compound such as 3-triethoxysilyl propyl succinic acid (or the anhydride thereof), 3-trimethoxysilyl propyl succinic acid (or the anhydride thereof), 3-methyldimethoxysilyl propyl succinic acid (or the anhydride thereof), 3-methyldiethoxysilyl propyl succinic acid (or the anhydride thereof), and 1-carboxy-3-triethoxysilyl propyl succinic acid anhydride; an amino group containing silane compound such as N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, and N-phenyl-γ-aminopropyltrimethoxysilane; a hydroxyl group containing silane compound such as γ-hydroxypropyltrimethoxysilane; an amide group containing silane based compound such as γ-amidopropyltrimethoxysilane; an isocyanate group containing silane compound such as γ-isocyanatepropyltrimethoxysilane; and an isocyanurate skeleton containing silane compound such as tris (3-trimethoxysilylpropyl) isocyanurate, and tris (3-triethoxysilylpropyl)isocyanurate. In terms of enhancing durability, it is preferable that the silane compound is used.

A used amount of the silane compound relative to 100 parts by weight of the acrylic copolymer (A) is controlled to not less than 0.01 and not more than 3 parts by weight, preferably not less than 0.01 and not more than 2 parts by weight and more preferably not less than 0.02 and not more than 1 parts by weight, for the purpose of enhancing durability of the adhesive composition.

In the adhesive composition according to the first embodiment, various types of additive agents, solvents, weather resistant stabilizers, tackifiers, plasticizers, softeners, dyes, pigments, and inorganic fillers other than the acrylic copolymer (A), the isocyanate compound (B), the crosslinking agent other than the isocyanate compound, the compound (C) having a hydroxyl group and a rosin skeleton and the silane compound can be appropriately blended in an amount within a range that does not damage advantageous effects provided by the adhesive composition according to the first embodiment.

The range of blending amount of the weather resistant stabilizer, plasticizer, softener, dye, pigment, inorganic filler and the like is preferably not more than 30 parts by weight, more preferably not more than 20 parts by weight, furthermore preferably not more than 10 parts by weight, relative to 100 parts by weight of the acrylic copolymer (A). The blending amount is defined within the above-mentioned range, thereby a balance among adhesion force, wettability, heat resistance, and adhesive transfer property of the adhesive composition can be appropriately maintained and an adhesive composition having good various types of properties can be obtained.

In the adhesive composition according to the first embodiment, it is considered that the reactive functional groups of the acrylic copolymer (A) and the isocyanate compound (B) form a crosslinking structure, and an isocyanate group not contributing to the crosslinking reaction reacts with water in the curing environment and the compound (C) having a hydroxyl group and a rosin skeleton so as to form a multimeric complex. The gel fraction after the crosslinking structure and the multimeric complex are formed is controlled to not less than 30% by weight, preferably not less than 45% by weight, more preferably not less than 60% by weight, for the purpose of preventing the occurrence of air bubbles at a durability evaluation. In addition, the gel fraction after the crosslinking structure and the multimeric complex are formed is controlled to not more than 95% by weight, for the purpose of preventing the occurrence of separation at a durability evaluation.

The gel fraction can be measured by the method described below.

(Measurement of Gel Fraction of Adhesive Composition)

The gel fraction is measured in accordance with the steps (1) to (6) described below.

(1) Coating a separation sheet of which surface is treated by a silicone based release agent with a solution of the adhesive composition in such a way that a coating amount becomes 25 g/m$^2$ after drying, and drying by a hot air circulation type drying machine at 100 degrees C. for 90 seconds, so as to form a pressure-sensitive adhesive layer having a film-like shape.

(2) Curing the pressure-sensitive adhesive layer formed for 10 days under the environment of 23 degrees C. and 65% relative humidity (RH).

(3) Adhering approximate 0.25 g of the adhesive layer having a film-like shape obtained in the step (2) to a metallic net of 250 mesh (100 mm×100 mm) accurately weighted, and wrapping it so as not to leak the gel fraction. After that, the weight is accurately measured by a precision balance so as to fabricate samples.

(4) Immersing the above-mentioned metallic net in an ethyl acetate solution for 3 days.

(5) After the immersion, taking out the metallic net and cleaning by a little amount of ethyl acetate and drying at 120 degrees C. for 24 hours. After that, the weight is accurately measured by a precision balance.

(6) Calculating the gel fraction by the following formula.

$$\text{Gel fraction (\% by weight)}=(C-A)/(B-A)\times 100$$

In the formula, (A) represents the weight of the metallic net (g), (B) represents the weight of the metallic net to which the adhesive layer is adhered ((B-A) represents the weight of adhesive layer) (g), and (C) represents the weight of the metallic net dried after the immersion ((C-A) represents the weight of gel resin) (g).

The adhesive composition according to the first embodiment is manufactured by passing through at least the step of mixing the acrylic copolymer (A) containing a reactive functional group, the isocyanate compound (B) that conducts a crosslinking reaction with the reactive functional group, and the compound (C) having a hydroxyl group and a rosin skeleton. Then, in the mixing step, the isocyanate compound (B) is mixed into the mixture of the acrylic copolymer (A) in such an amount that the equivalent of the isocyanate group of the isocyanate compound (B) becomes larger than the total equivalent of the reactive functional group of the acrylic copolymer (A). In particular, the adhesive composition according to the first embodiment is manufactured by passing through the steps of preparing the acrylic copolymer (A) that contains a reactive functional group, preparing the isocyanate compound (B) that conducts a crosslinking reaction with the reactive functional group, preparing the compound (C) having a hydroxyl group and a rosin skeleton, and mixing the acrylic copolymer (A) prepared, the isocyanate compound (B) prepared and the compound (C) having a hydroxyl group and a rosin skeleton prepared. Also, in the step of preparing the isocyanate compound (B), the isocyanate compound (B) is prepared in such an amount that the equivalent of the isocyanate group of the isocyanate compound (B) becomes larger than the equivalent of the reactive functional group of the acrylic copolymer (A).

In addition, the optical film according to the first embodiment is an optical film that has a adhesive layer formed from the adhesive composition according to the first embodiment. The particular manufacturing method includes coating a release sheet with the adhesive composition according to the first embodiment and drying so as to form the adhesive layer on the release sheet. In addition, the optical film is manufactured by transferring the adhesive layer formed on the release sheet onto an optical film, and next curing it.

As the release sheet, it is possible to use a plastic sheet such as a polyester sheet to which a releasing treatment is applied by using a releasing agent such as a fluorine based resin, paraffin wax, and silicone. The thickness of adhesive layer formed on the release sheet is approximately controlled to, for example, not less than 1 µM and not more than 100 µm, preferably not less than 5 µm and not more than 50 µm, more preferably not less than 15 µm and not more than 30 µm, as a thickness after drying.

It is possible to dry the adhesive composition coated on the release sheet under the heating condition of approximately at 70 to 120 degrees C. for 1 to 3 minutes by a hot air drying machine.

It is possible to adjust the adhesion force of the adhesive composition according to the first embodiment and the adhesion force of the optical film including the adhesive layer formed of the adhesive composition to an adherend so as to obtain a desired adhesion force, by adjusting the kind and amount of the reactive functional groups of the acrylic copolymer (A), the isocyanate compound (B) and the like.

(Advantageous Effects of the First Embodiment)

It is considered that the adhesive composition according to the first embodiment and the optical film including the adhesive layer formed of the adhesive composition have the above-mentioned configuration, so that they have high cohesion force due to both of the chemical crosslinking obtained by the reaction of the reactive functional group of the acrylic copolymer (A) with the crosslinking agent, and the physical crosslinking obtained by that the isocyanate groups of the isocyanate compound (B) not contributing to the crosslinking reaction react with water in the curing environment and the compound (C) having a hydroxyl group and a rosin skeleton so as to form the multimeric complex which restrains the movement of molecule chains of the acrylic copolymer, thereby they have good durability and are excellent in a stress relaxation property due to the fact that a part of the physical crosslinking that restrains the movement of molecule chains has also flowability, so that they can have durability and simultaneously prevent the white spots at a high level.

Namely, in the adhesive composition according to the first embodiment, the isocyanate compound (B) is used in such an amount that the equivalent of the isocyanate group of the isocyanate compound (B) becomes larger than the equivalent of the reactive functional group of the acrylic copolymer (A), so that not only the chemical crosslinking due to the reaction between the reactive functional group of the acrylic copolymer (A) and the crosslinking agent is produced, but also the multimeric complex derived from the reaction between the isocyanate compound (B) having the isocyanate group that does not react with the acrylic copolymer (A), of the isocyanate compound (B) added to the acrylic copolymer (A), and the compound (C) having a hydroxyl group and a rosin skeleton is also produced. Thereby, the adhesive composition according to the first embodiment has a structure that the multimeric complex of the isocyanate compound (B) and the compound (C) having a hydroxyl group and a rosin skeleton exists in the intertwined structure of the molecule chains produced by the chemical crosslinking due to the reaction between the reactive functional group of the acrylic copolymer (A) and the crosslinking agent. Consequently, the adhesive composition according to the first embodiment has a configuration that the multimeric complex is inhomogeneously dispersed in the intertwined structure of the molecule chains, so that for example, good transparency to a visible light can be ensured and simultaneously durability and prevention of white spots can be realized at a high level.

[Second embodiment]

(Mixture-type Adhesive Composition)

The adhesive composition according to the second embodiment includes an acrylic copolymer (A) containing a reactive functional group, an acrylic copolymer (D) containing a reactive functional group different from the acrylic copolymer (A), an isocyanate compound (B), and a compound (C) having a hydroxyl group and a rosin skeleton. Namely, the adhesive composition according to the second embodiment has almost the same configuration as the adhesive composition according to the first embodiment with the exception of further including the acrylic copolymer (D). Thus, detail explanation will be omitted except for the differences. Further, also in the adhesive composition according to the second embodiment, it is considered that the reactive functional groups of the acrylic copolymer (A) and the acrylic copolymer (D) and the isocyanate compound (B) carry out a cross-linking reaction with each other, and simultaneously an isocyanate group of the isocyanate compound (B) that does not contribute to the cross-linking reaction, of the isocyanate compound (B) reacts with water in a curing environment and the compound (C) having a hydroxyl group and a rosin skeleton so as to form a multimeric complex, thereby the adhesive composition according to the second embodiment has a good adhesive property.

In the second embodiment, it is preferable that in particular, a monomer having a carboxyl group of monomers having various functional groups as copolymer components is included in the acrylic copolymer (A) as the copolymer component.

In particular, in the second embodiment, the acrylic copolymer (D) is a copolymer that has a (meth)acrylate monomer as the main copolymer component, is obtained by copolymerizing a (meth)acrylate and a monomer having a reactive functional group and is different from the acrylic copolymer (A). The adhesive composition according to the second embodiment uses a mixture of the acrylic copolymer (A) and the acrylic copolymer (D) as the resin components so as to adjust cohesion force and stress relaxation properties to be well-balanced.

As the copolymer component of the acrylic copolymer (D) according to the second embodiment, it is possible to use a (meth)acrylate, a monomer having a reactive functional group and the other monomer that is the same copolymer component as the copolymer component exemplified in the acrylic copolymer (A). Of these, as the above-mentioned copolymer component, it is possible to appropriately use n-butylacrylate and t-butylacrylate for the reason of being excellent in enhancing durability of the adhesive composition, preventing the occurrence of white spots and compatibility with the acrylic copolymer (A). The content ratio of t-butylacrylate as the copolymer component is controlled to preferably not less than 10% by weight and not more than 20% by weight in the acrylic copolymer (D). In addition, it is preferable that the total amount of n-butylacrylate and t-butylacrylate in the acrylic copolymer (D) is controlled to not less than 98% by weight.

It is preferable that a carboxyl group containing monomer and a hydroxyl group containing monomer are included in the acrylic copolymer (D) as the copolymer component. If the acrylic copolymer (D) includes the carboxyl group containing monomer and the hydroxyl group containing monomer, the acrylic copolymer (D) having high cohesion force and simultaneously capable of easily adjusting cohesion force and stress relaxation properties can be realized.

The content ratio of the carboxyl group containing monomer as the copolymer component in the acrylic copolymer (D) is controlled to not less than 0.1% by weight, preferably not less than 0.3% by weight and more preferably not less than 0.5% by weight in the acrylic copolymer (D), for the purpose of increasing cohesion force of the adhesive composition so as to enhance durability of the adhesive composition. In addition, the content ratio of the carboxyl group containing monomer as the copolymer component is controlled to not more than 5% by weight, preferably not more than 3% by weight and more preferably not more than 2% by weight in the acrylic copolymer (D), for the purpose of preventing adhesion force of the adhesive composition from becoming too high.

The content ratio of the hydroxyl group containing monomer as the copolymer component in the acrylic copolymer (D) is controlled to not less than 0.01% by weight, preferably not less than 0.1% by weight and more preferably not less than 0.3% by weight in the acrylic copolymer (D), for the purpose of preventing the occurrence of white spots. In addition, the content ratio of the hydroxyl group containing monomer as the copolymer component is controlled to not more than 5% by weight, preferably not more than 3% by weight and more preferably not more than 1% by weight in the acrylic copolymer (D), for the purpose of preventing the occurrence of separation at durability test.

The weight-average molecular weight (Mw) of the acrylic copolymer (D) according to the second embodiment is controlled to preferably not less than 1,000,000, more preferably not less than 1,200,000, and most preferably not less than 1,400,000, for the purpose of providing sufficient cohesion force for the adhesive composition. In addition, the weight-average molecular weight (Mw) of the acrylic copolymer (D) is controlled to not more than 2,500,000, for the purpose of ensuring coating workability of the adhesive composition.

It is preferable that the glass-transition temperature (Tg) of the acrylic copolymer (D) according to the second embodiment is equal to or higher than the glass-transition temperature of the acrylic copolymer (A). If the above mentioned relationship between the glass-transition temperature (Tg) of the acrylic copolymer (A) and the glass-transition temperature (Tg) of the acrylic copolymer (D) is satisfied, the acrylic copolymer (D) has cohesion force equal to or higher than the acrylic copolymer (A), so that balance between cohesion force and stress relaxation properties of the resin components can be easily adjusted. In particular, the glass-transition temperature of the acrylic copolymer (D) is controlled to not less than −60 degrees C., and preferably not less than −50 degrees C., for the purpose of providing sufficient cohesion force for the adhesive composition and allowing the composition to develop sufficient durability. In addition, the glass-transition temperature of the acrylic copolymer (D) is controlled to not more than 0 degrees C., and preferably not more than −30 degrees C., for the purpose of allowing the adhesive composition to develop sufficient adhesion to the supporting substrate so as to allow the composition to develop durability that the separation or the like does not occur.

In addition, the polymerization method of the acrylic copolymer (D) used in the second embodiment is not particularly limited but the acrylic copolymer (D) can be polymerized by the same method as that of the acrylic copolymer (A). Further, when the adhesive composition according to the second embodiment is manufactured by using a mixture of copolymers obtained by the polymerization, it is preferable that the polymerization is carried out by solution polymerization, the reason is that processing steps thereof are relatively easy and it can be carried out in a short time. Further, as the solution polymerization, the same method as that adopted in the first embodiment can be adopted. Then, the weight-average molecular weight of the acrylic copolymer (D) according to the second embodiment can be also controlled so as to have a desired molecular weight by adjusting the reaction temperature, the reaction time, the amount of solvent and the sort and amount of catalyst.

The difference between the solubility parameter ($SP_A$) of acrylic copolymer (A) and the solubility parameter ($SP_D$) of acrylic copolymer (D) (namely, $\Delta SP = SP_A - SP_D$) is preferably not less than −0.5 and not more than 0.5, more preferably not less than −0.4 and not more than 0.4, and most preferably not less than −0.2 and not more than 0.2. If the difference between the solubility parameters (ASP) is included in the above-mentioned range, it is preferable, since compatibility between the acrylic copolymer (A) and the acrylic copolymer (D) becomes extremely excellent.

The solubility parameter is calculated by a method of Fedor. The method of Fedor is described in, for example, "SP value Base-Application and Calculation Method" (Author: Hideki Yamamoto, Publisher: Johokiko Co., Ltd., 2005). In the method of Fedor, the solubility parameter is calculated by the following Formula 2.

$$\text{Solubility parameter} = \sqrt{[\Sigma Ecoh/\Sigma V]} \qquad \text{[Formula 2]}$$

In the Formula 2, Ecoh represents a cohesion energy density, and V represents a mole molecular volume. The solubility parameter can be calculated by obtaining the sum of Ecoh and the sum of V, namely $\Sigma Ecoh$ and $\Sigma V$, in the repeating unit of polymers, based on Ecoh and V decided for each atom group. The solubility parameter of the copolymer can be calculated by calculating the solubility parameter of each homopolymer of each constituent unit constituting the copolymer in accordance with the above-mentioned Formula 2, and totalizing values obtained by multiplying each of the SP values by the mole fraction of each constituent unit.

The mixing ratio of the acrylic copolymer (A) and the acrylic copolymer (D) is controlled to not less than 50/50, preferably not less than 70/30, more preferably not less than 80/20, in a ratio by weight (weight of the acrylic copolymer (A)/weight of the acrylic copolymer (D)), for the purpose of preventing the occurrence of separation at durability test. In addition, the mixing ratio of the acrylic copolymer (A) and the acrylic copolymer (D) is controlled to not more than 99/1, preferably not more than 95/5, more preferably not more than 90/10, in a ratio by weight (weight of the acrylic copolymer (A)/weight of the acrylic copolymer (D)), for the purpose of preventing the occurrence of air bubbles at durability test.

Then, the adhesive composition according to the second embodiment includes an isocyanate compound (B). As the isocyanate compound (B), the same compound as that used in the first embodiment is used.

In the second embodiment, a used amount of the isocyanate compound (B) is controlled to not less than 5 parts by weight, preferably not less than 7 parts by weight relative to 100 parts by weight of a mixture of the acrylic copolymer (A) and the acrylic copolymer (D), for the purpose of preventing the occurrence of white spots. In addition, a used amount of the isocyanate compound (B) is controlled to not more than 20 parts by weight, preferably not more than 15 parts by weight relative to 100 parts by weight of the mixture of the acrylic copolymer (A) and the acrylic copolymer (D), for the purpose of ensuring compatibility between the copolymers and the isocyanate compound (B) and generating sufficient tackiness as an adhesive composition.

In addition, also in the adhesive composition according to the second embodiment similarly to the adhesive composition according to the first embodiment, it is considered that the isocyanate group of the isocyanate compound (B) not contributing to the crosslinking with the copolymers forms a multimeric complex by reacting with water in the curing environment and the compound (C) having a hydroxyl group and a rosin skeleton. Then, in the second embodiment, for the purpose of forming as much multimeric complex as possible in order to prevent the occurrence of white spots and enhance durability, the isocyanate group is used in an amount of more than 1 equivalent, preferably not less than 1.01 equivalent, more preferably not less than 1.2 equivalent, most preferably not less than 1.5 equivalent, relative to 1 equivalent of the total reactive functional groups of the acrylic copolymer (A) and the acrylic copolymer (D). In addition, in the adhesive composition according to the second embodiment, for the purpose of generating sufficient tacky feeling as an adhesive composition so as to allow the composition to develop durability that the separation does not occur, it is preferable that not more than 5 equivalent of the isocyanate group is used relative to 1 equivalent of the total reactive functional groups of the acrylic copolymer (A) and the acrylic copolymer (D).

The adhesive composition according to the second embodiment includes a compound (C) having a hydroxyl group and a rosin skeleton. As the compound (C) having a hydroxyl group and a rosin skeleton, the same compound as that used in the first embodiment is used. In addition, in the adhesive composition according to the second embodiment, it is preferable that a blending quantity ratio of the compound (C) having a hydroxyl group and a rosin skeleton relative to the isocyanate compound (B) is controlled similarly to the first embodiment.

In the second embodiment, a used amount of the compound (C) having a hydroxyl group and a rosin skeleton is controlled to not less than 1 parts by weight, preferably not less than 3 parts by weight, more preferably not less than 5 parts by weight, most preferably not less than 10 parts by weight relative to 100 parts by weight of the mixture of the acrylic copolymer (A) and the acrylic copolymer (D), for the purpose of preventing the occurrence of white spots. Also, the used amount of the compound (C) having a hydroxyl group and a rosin skeleton is controlled to preferably not more than 20 parts by weigh relative to 100 parts by weight of the mixture of the acrylic copolymer (A) and the acrylic copolymer (D), for the purpose of ensuring compatibility between the mixture of the acrylic copolymer (A) and the acrylic copolymer (D) and the compound (C) having a hydroxyl group and a rosin skeleton.

In addition, a used amount of the silane compound relative to 100 parts by weight of the mixture of the acrylic copolymer (A) and the acrylic copolymer (D) is controlled to not less than 0.01 and not more than 3 parts by weight, preferably not less than 0.01 and not more than 2 parts by weight and more preferably not less than 0.02 and not more than 1 parts by weight, for the purpose of enhancing durability of the adhesive composition. Furthermore, in the adhesive composition according to the second embodiment, various types of additive agents and the like other than the above-mentioned acrylic copolymer (A), the acrylic copolymer (D), the isocyanate compound (B), the crosslinking agent other than the isocyanate compound, the compound (C) having a hydroxyl group and a rosin skeleton and the silane compound can be appropriately blended in an amount within a range that does not damage advantageous effects provided by the adhesive composition according to the second embodiment similarly to the first embodiment.

Furthermore, in the adhesive composition according to the second embodiment, it is considered that the reactive functional groups of the acrylic copolymer (A) and the acrylic copolymer (D) and the isocyanate compound (B) form a crosslinking structure, and an isocyanate group not contributing to the crosslinking reaction reacts with water in the environment and the compound (C) having a hydroxyl group and a rosin skeleton so as to form a multimeric complex. The gel fraction after the crosslinking structure and the multimeric complex are formed is controlled to not less than 30% by weight, preferably not less than 45% by weight, more preferably not less than 60% by weight, for the purpose of preventing the occurrence of air bubbles at a durability evaluation. In addition, the gel fraction after the crosslinking structure and the multimeric complex are formed is controlled to not more than 95% by weight, for the purpose of preventing the occurrence of separation at a durability evaluation.

EXAMPLES

Hereinafter, Examples and Comparative Examples will be explained. Further, fabrication of test pieces used in Examples and Comparative Examples, and various types of test method and evaluation method are as follows.

(1) Fabrication of Optical Film for Test

As an example of an optical film, a polarizing film having an adhesive layer was fabricated by using a polarizing film. An adhesive composition was coated on a release film of which surface was treated by a silicone based releasing agent in such a manner that a coating amount becomes 25 g/m$^2$ after drying. Next, drying was carried out by a hot air circulation type drying machine at 100 degrees C. for 90 seconds, so as to form an adhesive layer. Subsequently, the surface of adhesive layer was laminated on the rear surface of a polarizing base film [having a structure that triacetate cellulose (TAC) films are laminated on both surfaces of a polarizer having a polyvinyl alcohol (PVA) film as the main part; approximately 190 μm], and pressure bonding was carried out by passing between pressure nip rollers. After the pressure bonding, curing was carried out for 10 days under the environment of 23 degrees C. and 65% relative humidity (RH), so as to obtain a polarizing film having an adhesive layer.

(2) Evaluation of Durability

The polarizing film fabricated in the above-mentioned "(1) Fabrication of optical film for test" was cut out so as to incline the long side at a 45 degree angle to the absorption axis of light, as a result, test pieces of 140 mm×260 mm were obtained, and the test pieces were used so as to be bonded to one surface of an alkali free glass plate having a thickness of 0.7 mm sold under a trade name of "#1737" and manufactured by Corning Incorporated by using a laminator. Next, the test samples were subjected to autoclave treatment (50 degrees C., 5 kg/cm$^2$, and 20 minutes), and were left for 24 hours under the condition of 23 degrees C. and 65% relative humidity (RH). After that, they were left for 1000 hours under the environment of 80 degrees C. DRY, 105 degrees C. DRY, and 60 degrees C. 90% relative humidity (RH) respectively, and states of occurrence of air bubble and separation were evaluated by visual observation. The basis for evaluation is as follows.

(Basis for Evaluation of Durability)
a) Occurrence of air bubbles
○: Occurrence of air bubbles is not observed at all.
□: Occurrence of air bubbles is hardly observed.
x: Occurrence of air bubbles is remarkably observed.
b) Separation
○: Separation is not observed in four sides.
□: Separation is not observed at the location of not less than 0.3 mm from the peripheral edge portion in four sides.
x: Separation is observed at the location of not less than 0.3 mm from the peripheral edge portion in any one of four sides.

(3) Evaluation Test of White Spots Phenomenon

The polarizing films with an adhesive layer having the same size as that used in the above-mentioned "(2) Evaluation of durability" were laminated on both surfaces of an alkali free glass plate having a thickness of 0.7 mm sold under a trade name of "#1737" and manufactured by Corning Incorporated in such a way that polarizing axes were at right angles to each other, so as to fabricate test samples. Next, the samples were subjected to autoclave treatment (50 degrees C., 5 kg/cm$^2$, and 20 minutes) and were left for 24 hours under the condition of 23 degrees C. and 50% relative humidity (RH). After that, they were left for 500 hours under the condition of 80 degrees C. and dry. After being left, the brightness of 17×31 points (527 points) was measured by using a uniform source (manufactured by I-System Co., LTD.) by "EyeScale-3W" manufactured by I-System Co., LTD. under the condition of 23 degrees C. and 50% relative humidity (RH), the maximum brightness value (cd/m$^2$) thereof was measured and the number of measurement point in which the brightness was not less than 6 cd/m$^2$ were counted, the evaluating index of the white spots is obtained by the formula 3 described below, and the state of white spots was evaluated in accordance with the basis for evaluation described below.

Evaluating index of white spots=Maximum brightness value×(Number of measurement point in which brightness is not less than 6 cd/m$^2$)     [Formula 3]

(Basis for Evaluation of White Spots)
◎: Evaluating index of white spots is not less than 0 and less than 100.
○: Evaluating index of white spots is not less than 100 and less than 400.
x: Evaluating index of white spots is more than 400.

(Manufacturing of Acrylic Copolymer)

Manufacturing Example 1

99 parts by weight of n-butylacrylate (BA), 1 part by weight of acrylic acid (AA), 100 parts by weight of ethyl acetate (EAc) and 0.1 part by weight of azobisisobutylonitrile (AIBN) were introduced into a reactor vessel equipped with a thermometer, a stirrer, a nitrogen introduction tube and a reflux cooling tube, and nitrogen gas was substituted for air in the reactor vessel. After that, the temperature of content was elevated to 65 degrees C. and reaction was carried out for 8 hours in a nitrogen atmosphere by stirring. After the completion of the reaction, the reaction mixture was diluted with ethyl acetate, so as to obtain an acrylic copolymer solution that has solid content of 16.8% by weight. The weight-average molecular weight of the acrylic copolymer was 1,670,000.

Manufacturing Examples 2 to 3, 6

Polymerization was carried out similarly to manufacturing example 1 except that a monomer composition shown in each manufacturing example of Table 1 was used for the copolymer composition instead of the copolymer composition used in manufacturing example 1. Table 1 shows a copolymer composition, a solid content, a glass-transition temperature (Tg), a solubility parameter (SP value), and a weight-average molecular weight (Mw), of each manufacturing example.

Manufacturing Example 4

99 parts by weight of n-butylacrylate (BA), 1 part by weight of acrylic acid (AA), 92 parts by weight of ethyl acetate (EAc) and 0.1 part by weight of azobisisobutylonitrile (AIBN) were introduced into a reactor vessel equipped with a thermometer, a stirrer, a nitrogen introduction tube and a reflux cooling tube, and nitrogen gas was substituted for air in the reactor vessel. After that, the temperature of content was elevated to 65 degrees C. and reaction was carried out for 8 hours in a nitrogen atmosphere by stirring. After the completion of the reaction, the reaction mixture was diluted with ethyl acetate, so as to obtain an acrylic copolymer solution that has solid content of 18.9% by weight. The weight-average molecular weight of the acrylic copolymer was 2,140,000.

Manufacturing Example 5

Polymerization was carried out similarly to manufacturing example 4 except that a monomer composition shown in manufacturing example 5 of Table 1 was used for the copolymer composition instead of the copolymer composition used in manufacturing example 4.

TABLE 1

| | Composition and characteristics of acrylic copolymer | | | | | | |
|---|---|---|---|---|---|---|---|
| | Items | ME 1 | ME 2 | ME 3 | ME 4 | ME 5 | ME 6 |
| Copolymer Composition | BA (pbw) | 99 | 83.5 | 97 | 99 | 83.5 | 100 |
| | t-BA (pbw) | 0 | 15 | 0 | 0 | 15 | 0 |
| | AA (pbw) | 1 | 1 | 3 | 1 | 1 | 0 |
| | 2HEA (pbw) | 0 | 0.5 | 0 | 0 | 0.5 | 0 |

TABLE 1-continued

Composition and characteristics of acrylic copolymer

| | Items | ME 1 | ME 2 | ME 3 | ME 4 | ME 5 | ME 6 |
|---|---|---|---|---|---|---|---|
| Characteristic Value | Solid content (% bw) | 16.8 | 19.7 | 22.7 | 18.9 | 19.0 | 22.8 |
| | Tg (degrees C.) | −55 | −45 | −51 | −55 | −45 | −57 |
| | SP value ($J^{1/2}/m^{3/2}$) | 20.14 | 20.07 | 20.44 | 20.14 | 20.07 | 19.99 |
| | Mw (×$10^4$) | 167 | 146 | 172 | 214 | 197 | 153 |

BA: n-butyl acrylate
t-BA: t-butyl acrylate
AA: acrylic acid
2HEA: 2-hydroxyethylacrylate
pbw: parts by weight
% bw: % by weight
ME 1 to ME 6: Manufacturing Example 1 to Manufacturing Example 6

(Manufacturing of Pressure-sensitive Adhesive Composition for Polarization Plate)

Example 1

As the acrylic copolymer (A), 506 parts by weight of the acrylic copolymer solution (85 parts by weight as the acrylic copolymer (A)) synthesized by manufacturing example 1; as the acrylic copolymer (D), 76 parts by weight of the acrylic copolymer solution (15 parts by weight as the acrylic copolymer (D)) synthesized by manufacturing example 2; as the isocyanate compound (B), 9.3 part by weight of "Coronate L" (polyisocyanate compound manufactured by Nippon Polyurethane Industry Co., Ltd., 7 parts by weight as an active component); as an epoxy compound, 0.02 parts by weight of "TETRAD-X" (manufactured by Mitsubishi Gas Chemical Company Inc., 0.02 part by weight as an active component); as the compound (C) having a hydroxyl group and a rosin skeleton, 5 parts by weight of "D-6011" (diol containing rosin manufactured by Arakawa Chemical Industries, LTD., 5 part by weight as an active component); and as a silane compound, 0.1 parts by weight of "KBM-403" (silane coupling agent manufactured by Shin-Etsu Chemical Co., Ltd., 0.1 part by weight as an active component) were sufficiently mixed and stirred, so as to obtain an adhesive composition. An equivalent of the isocyanate group relative to 1 equivalent of the total reactive functional groups of the acrylic copolymer (A) and the acrylic copolymer (D) is 2.01 equivalent (described as "NCO/resin functional group" in Tables 2 and Table 3). By using the adhesive composition obtained, tests were carried out by the above-mentioned measurement method of gel fraction, and the result was shown in Table 2. In addition, by using the adhesive composition obtained, optical films for test were fabricated by the above-mentioned fabrication method of optical film for test, the above-mentioned various measurement were carried out, and the result was shown in Table 4.

Examples 2 to 15, Comparative Examples 1 to 4

Adhesive compositions (adhesive compositions according to Examples 2 to 15, and adhesive compositions according to Comparative Examples 1 to 4) were manufactured in the same manner as Example 1 except that the composition of each Example and each Comparative Example shown in Table 2 and Table 3 was adopted instead of the composition used in Example 1. By using the adhesive compositions obtained, the tests were carried out by the above-mentioned measurement method of gel fraction, and the result was shown in Table 2 and Table 3. In addition, by using the adhesive compositions obtained, the optical films for test were fabricated by the above-mentioned fabrication method of optical film for test, the above-mentioned various measurement were carried out, and the result was shown in Table 4 and Table 5.

TABLE 2

Composition of adhesive composition and properties of adhesive

| Items | | Ex1 | Ex2 | Ex3 | Ex4 | Ex5 | Ex6 | Ex7 | Ex8 | Ex9 | Ex10 |
|---|---|---|---|---|---|---|---|---|---|---|---|
| Acrylic copolymer (A) | Sort | ME 1 | ME 1 | ME 1 | ME 1 | ME 1 | ME 1 | ME 1 | ME 1 | ME 3 | ME 3 |
| | Add. amt (pbw) | 85 | 85 | 85 | 85 | 85 | 85 | 85 | 85 | 100 | 100 |
| Acrylic copolymer (D) | Sort | ME 2 | ME 2 | ME 2 | ME 2 | ME 2 | ME 2 | ME 2 | ME 2 | — | — |
| | Add. amt (pbw) | 15 | 15 | 15 | 15 | 15 | 15 | 15 | 15 | — | — |
| (a) Coronate L | Add. amt (pbw) | 7 | 7 | 7 | 7 | 7 | 7 | 10 | 15 | 15 | 15 |
| | NCO/resin f. g. | 2.0 | 2.0 | 2.0 | 2.0 | 2.0 | 2.0 | 2.9 | 4.3 | 1.5 | 1.5 |
| (b) TETRAD-X | Add. amt (pbw) | 0.02 | 0.02 | 0.02 | 0.02 | 0.02 | 0.02 | 0.02 | 0.02 | 0.02 | 0.02 |
| (c) D-6011 | Add. amt (pbw) | 5 | 10 | 15 | 2.5 | 20 | — | 10 | 10 | 5 | 15 |
| (d) KE-359 | Add. amt (pbw) | — | — | — | — | — | 10 | — | — | — | — |
| NEOTALL 150P | Add. amt (pbw) | — | — | — | — | — | — | — | — | — | — |
| (e) FTR-6100 | Add. amt (pbw) | — | — | — | — | — | — | — | — | — | — |
| KE-100 | Add. amt (pbw) | — | — | — | — | — | — | — | — | — | — |
| (f) KBM-403 | Add. amt (pbw) | 0.1 | 0.1 | 0.1 | 0.1 | 0.1 | 0.1 | 0.1 | 0.1 | 0.1 | 0.1 |
| Gel Fraction (% bw) | | 72 | 68 | 64 | 74 | 61 | 67 | 73 | 77 | 87 | 79 |

Add. amt: Additive amount
pbw: parts by weight
NCO/resin f. g.: NCO/resin functional group
% bw: % by weight
Ex1 to Ex10: Example 1 to Example 10
ME 1 to ME 3: Manufacturing Example 1 to Manufacturing Example 3

TABLE 3

Composition of adhesive composition and properties of adhesive

| Items | | Ex11 | Ex12 | Ex13 | Ex14 | Ex15 | CoEx1 | CoEx2 | CoEx3 | CoEx4 |
|---|---|---|---|---|---|---|---|---|---|---|
| Acrylic copolymer (A) | Sort | ME 1 | ME 1 | ME 1 | ME 1 | ME 4 | ME 1 | ME 1 | ME 1 | ME 6 |
| | Add. amt (pbw) | 85 | 85 | 85 | 85 | 85 | 85 | 85 | 85 | 85 |
| Acrylic copolymer(D) | Sort | ME 2 | ME 2 | ME 2 | ME 2 | ME 5 | ME 2 | ME 2 | ME 2 | ME 2 |
| | Add. amt (pbw) | 15 | 15 | 15 | 15 | 15 | 15 | 15 | 15 | 15 |
| (a) Coronate L | Add. amt (pbw) | 5 | 5 | 7 | 15 | 10 | 7 | 7 | 7 | 7 |
| | NCO/resin f. g. | 1.4 | 1.4 | 2.0 | 4.3 | 2.9 | 2.0 | 2.0 | 2.0 | 10.7 |
| (b) TETRAD-X | Add. amt (pbw) | 0.02 | 0.02 | 0.02 | 0.02 | 0.02 | 0.02 | 0.02 | 0.02 | 0.02 |
| (c) D-6011 | Add. amt (pbw) | 10 | 20 | — | 5 | 10 | — | — | — | 10 |
| (d) KE-359 | Add. amt (pbw) | — | — | — | — | — | — | — | — | — |
| NEOTALL 150P | Add. amt (pbw) | — | — | 10 | — | — | — | — | — | — |
| (e) FTR-6100 | Add. amt (pbw) | — | — | — | — | — | — | 10 | — | — |
| KE-100 | Add. amt (pbw) | — | — | — | — | — | — | — | 10 | — |
| (f) KBM-403 | Add. amt (pbw) | 0.1 | 0.1 | 0.1 | 0.1 | 0.1 | 0.1 | 0.1 | 0.1 | 0.1 |
| Gel Fraction (% bw) | | 65 | 57 | 69 | 76 | 75 | 76 | 67 | 69 | 37 |

Add. amt: Additive amount
pbw: parts by weight
NCO/resin f. g.: NCO/resin functional group
% bw: % by weight
Ex11 to Ex15: Example 11 to Example 15
CoEx1 to CoEx4: Comparative Example 1 to Comparative Example 4
ME 1, 2, 4, 5 and 6: Manufacturing Example 1, 2, 4, 5 and 6

Further, in Table 2, "NEOTALL 150P" shows a rosin phenol manufactured by Harima Chemicals, Inc., and "KE-100" shows a rosin ester (however, the rosin ester does not have a hydroxyl group) manufactured by Arakawa Chemical Industries, LTD.

Further, in Table 2 and Table 3, "NCO/resin functional group" shows an equivalent of the isocyanate group relative to 1 equivalent of the total reactive functional groups of the acrylic copolymers in each composition example.

Further, abbreviations of each composition in Table 2 and Table 3 are as follows, and additive amount of each component is shown by a part by weight of active component.

(a) Coronate L: "an isocyanate compound manufactured by Nippon Polyurethane Industry Co., Ltd."
Trade name; Coronate L, Active component; 75% by weight
Tolylene diisocyanate adduct of trimethylol propane
Isocyanate compound (B) component (b) TETRAD-X: "an epoxy compound manufactured by Mitsubishi Gas Chemical Company Inc."
Trade name; TETRAD-X, Active component; 100% by weight
Chemical name; N,N,N',N'-tetraglycidyl-m-xylylenediamine Epoxy compound (c) D-6011: "a rosin-containing diol manufactured by Arakawa Chemical Industries, LTD."
Trade name; Pine Crystal D-6011, Active component; 100% by weight
Compound (C) component having a hydroxyl group and a rosin skeleton shown in formula (2)

(d) KE-359: "a hydroxy group-containing rosin ester manufactured by Arakawa Chemical Industries, LTD."
Trade name; Pine Crystal KE-359, Active component; 100% by weight
Compound (C) component having a hydroxyl group and a rosin skeleton (e) FTR-6100: "a petroleum-based tackifier resin manufactured by Mitsui chemicals, Inc."
Trade name; FTR-6100, Active component; 100% by weight (f) KBM-403: "a silane coupling agent manufactured by Shin-Etsu Chemical Co., Ltd."
Trade name: KBM-403, Active component; 100% by weight
Chemical name: 3-glycydoxypropyltrimethoxysilane
Silane Compound Component NEOTALL 150P: "a rosin phenol manufactured by Harima Chemicals, Inc." KE-100: "a rosin ester manufactured by Arakawa Chemical Industries, LTD."
Trade name; Pine Crystal KE-100

TABLE 4

Properties of optical film

| | | Ex1 | Ex2 | Ex3 | Ex4 | Ex5 | Ex6 | Ex7 | Ex8 | Ex9 | Ex10 |
|---|---|---|---|---|---|---|---|---|---|---|---|
| Durability (80 degrees C.) | OAB | ○ | ○ | ○ | ○ | ○ | ○ | ○ | ○ | ○ | ○ |
| | Separation | ○ | ○ | ○ | ○ | ○ | ○ | ○ | ○ | ○ | ○ |
| Durability (105 degrees C.) | OAB | ○ | ○ | ○ | ○ | ○ | ○ | ○ | ○ | ○ | ○ |
| | Separation | ○ | ○ | ○ | ○ | ○ | ○ | ○ | ○ | ○ | ○ |
| Durability (60 degrees C. × 90% RH) | OAB | ○ | ○ | ○ | ○ | ○ | ○ | ○ | ○ | ○ | ○ |
| | Separation | ○ | ○ | ○ | ○ | ○ | ○ | ○ | ○ | ○ | ○ |
| White spots | Evaluating index of WS | 175 | 77 | 12 | 290 | 0 | 219 | 43 | 0 | 24 | 0 |
| | Evaluation | ○ | ◎ | ◎ | ○ | ◎ | ○ | ◎ | ◎ | ◎ | ◎ |

OAB: Occurrence of air bubbles
Evaluating index of WS: Evaluating index of white spots
Ex1 to Ex10: Example 1 to Example 10

TABLE 5

| Properties of optical film | | | | | | | | | | |
|---|---|---|---|---|---|---|---|---|---|---|
| | | Ex12 | Ex13 | Ex14 | Ex15 | Ex16 | CoEx1 | CoEx2 | CoEx3 | CoEx4 |
| Durability (80 degrees C.) | OAB | ○ | ○ | ○ | ○ | ○ | ○ | Δ | ○ | X |
| | Separation | ○ | ○ | ○ | ○ | ○ | ○ | ○ | ○ | Δ |
| Durability (105 degrees C.) | OAB | ○ | Δ | ○ | ○ | ○ | ○ | Δ | ○ | X |
| | Separation | ○ | ○ | ○ | ○ | ○ | ○ | ○ | ○ | Δ |
| Durability (60 degrees C. × 90% RH) | OAB | ○ | ○ | ○ | ○ | ○ | ○ | ○ | ○ | ○ |
| | Separation | ○ | ○ | ○ | ○ | ○ | ○ | ○ | ○ | X |
| White spots | Evaluating index of WS | 180 | 25 | 220 | 12 | 34 | 739 | 1079 | 740 | 385 |
| | Evaluation | ○ | ⊚ | ○ | ⊚ | ⊚ | X | X | X | ○ |

OAB: Occurrence of air bubbles
Evaluating index of WS: Evaluating index of white spots
Ex12 to Ex16: Example 12 to Example 16
CoEx1 to CoEx4: Comparative Example 1 to Comparative Example 4

As can be seen from Table 4 and Table 5, all the optical films according to Examples 1 to 15 obtained the basis for evaluation of "⊚" or "○" in all the items of durability (80 degrees C.), durability (60 degrees C.×90% RH), and white spots. Namely, it was shown that the optical films according to Examples 1 to 15 have excellent durability even in a high temperature or in a high temperature and high humidity environment, and are capable of preventing the occurrence of white spots.

Further, the optical film having the adhesive compositions for optical film according to the embodiments and Examples is excellent in preventing the occurrence of white spots, and there is no occurrence of air bubbles and separation that normally occurs in a high temperature or in a high temperature and high humidity environment, so that it can be applied to an optical film used for a display device such as a personal computer, a television set, a car navigation system.

Hereinbefore, the embodiments and Examples of the invention have been explained, but the above-mentioned embodiments and Examples do not restrict the invention according to the scope of claim for patent. Also, it should be noted that all of the combinations of features explained in the embodiments and Examples are not absolutely necessary for means for solving the problem of the invention.

What is claimed is:

1. An optical film adhesive composition, comprising:
   an acrylic copolymer (A) comprising a carboxyl group;
   an isocyanate compound (B); and
   a compound (C) having a hydroxyl group and a rosin skeleton,
   wherein a blending quantity ratio of the compound (C) relative to the isocyanate compound (B) is not less than 0.3 and not more than 3,
   wherein a gel fraction after a crosslinking structure and a multimeric complex are formed is not less than 45% by weight, and
   wherein a ratio of an equivalent of an isocyanate group relative to 1 equivalent of a total of a reactive functional group of the acrylic copolymer (A) is more than 1.

2. The optical film adhesive composition according to claim 1, wherein the adhesive composition further comprises an acrylic copolymer (D) comprising a carboxyl group and a hydroxyl group.

3. The optical film adhesive composition according to claim 1, wherein not less than 5 parts by weight and not more than 20 parts by weight of the isocyanate compound (B) are included relative to 100 parts by weight of a total amount of the acrylic copolymer (A).

4. The optical film adhesive composition according to claim 1, wherein not less than 1 parts by weight and not more than 20 parts by weight of the compound (C) are included relative to 100 parts by weight of a total amount of the acrylic copolymer (A).

5. The optical film adhesive composition according to claim 1, wherein the ratio of the equivalent of the isocyanate group relative to 1 equivalent of the total of the reactive functional group of the acrylic copolymer (A) is not more than 5.

6. The optical film adhesive composition according to claim 2, wherein the acrylic copolymer (D) comprises t-butyl acrylate as a copolymer component.

7. The optical film adhesive composition according to claim 1, wherein the compound (C) comprises a compound comprising a skeleton represented by a formula (1) described below in a molecule thereof

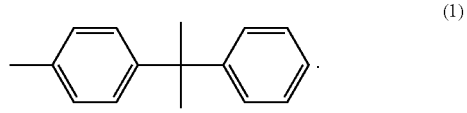 [SMILES: Cc1ccc(C(C)(C)c2ccccc2)cc1]
(1)

* * * * *